Jan. 8, 1924.
S. I. FEKETE
1,479,905
HEATER FOR INTAKE MANIFOLDS FOR INTERNAL COMBUSTION ENGINES
Filed April 19, 1921
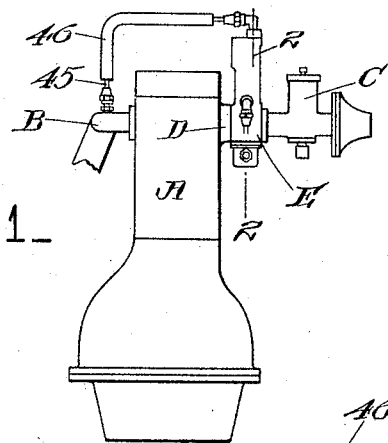
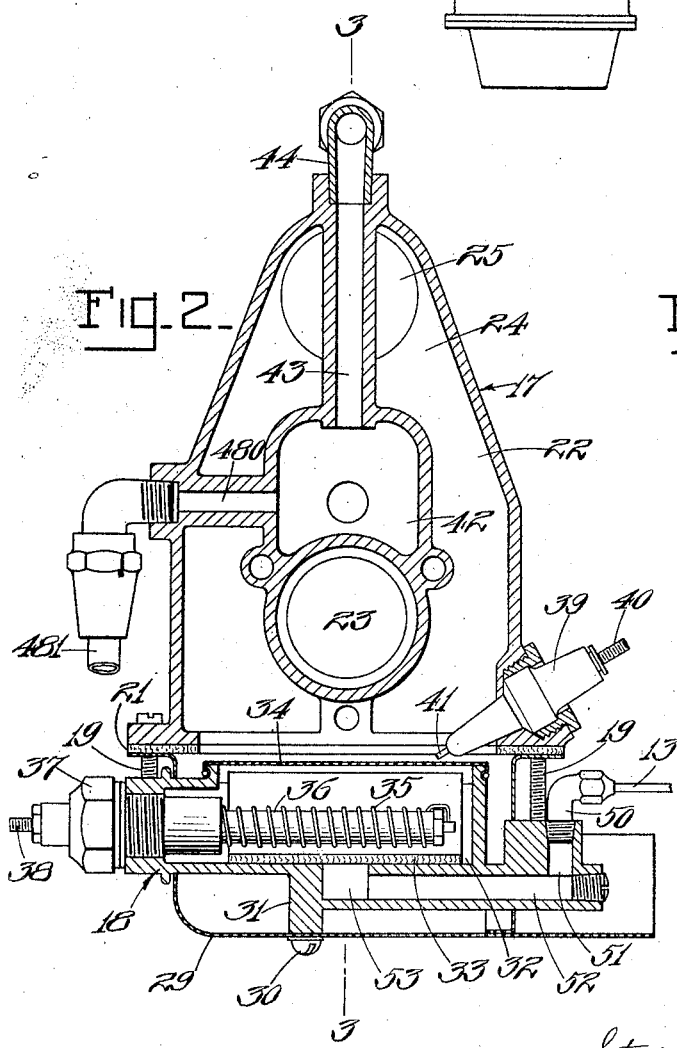
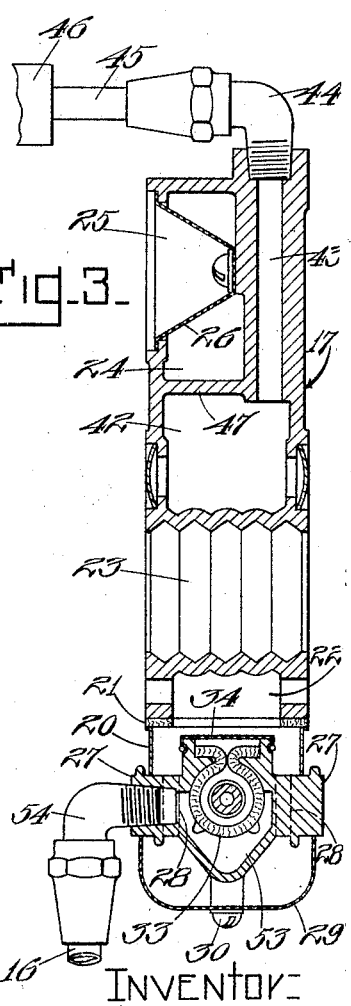
INVENTOR:
Stephen Ivan Fekete
by Macleod, Calver, Copeland & Dike
Attys.

Patented Jan. 8, 1924.

1,479,905

UNITED STATES PATENT OFFICE.

STEPHEN IVAN FEKETE, OF DETROIT, MICHIGAN, ASSIGNOR TO ESSEX MOTORS, OF DETROIT, MICHIGAN, A CORPORATION OF MICHIGAN.

HEATER FOR INTAKE MANIFOLDS FOR INTERNAL-COMBUSTION ENGINES.

Application filed April 19, 1921. Serial No. 462,541.

*To all whom it may concern:*

Be it known that I, STEPHEN IVAN FEKETE, a citizen of the United States, residing at Detroit, county of Wayne, State of Michigan, have invented a certain new and useful Improvement in Heaters for Intake Manifolds for Internal-Combustion Engines, of which the following is a specification, reference being had therein to the accompanying drawings.

This invention relates to devices for supplying heat to the contents of the intake manifold of an internal combustion engine, and is in the nature of an improvement on the stoves for intake manifolds shown and described in my prior application, filed October 5, 1920, Serial No. 414,921 and in my Patent No. 1,396,363 dated November 8, 1921, respectively. In said prior application and patent are shown stove units adapted for insertion between the carbureter and intake manifold of an internal combustion engine, each of said units comprising a short length of tubing which, when the device is in place, constitutes an extension of the intake manifold, together with a fluid fuel burner arranged to heat said manifold extension and thereby supply heat to the charge during its passage from the carbureter to the engine in order to facilitate the starting of the engine, said burner being automatically extinguished after sufficient heat has been supplied for the latter purpose.

The present invention has for its object to provide a charge-heating device of the general character above referred to having means whereby, after the engine has been started, a suitable heated fluid from the engine, preferably a portion of the hot waste gases or products of combustion in the exhaust manifold, may be passed through the device and in proximity to the intake manifold extension, so that the device will be adapted to heat the incoming charge during the normal operation of the engine without the combustion of additional fuel.

Another object of the invention is to provide improved means, in a device of the character referred to, for feeding the fuel to the burner, which means are of such character as to reduce to a minimum all danger of explosion or other accident and provide a substantially even, constant and reliable feed under varying conditions of use, the device having, in common with those shown in my prior application aforesaid, means for automatically limiting the amount of fuel which may be supplied to the device in order that the burner may be automatically extinguished after the desired heating effect has been produced, and in order otherwise to prevent improper operation of the device or useless waste of fuel.

The foregoing objects of the invention, together with means for carrying the same into effect, will best be understood from the following description of certain forms or embodiments thereof illustrated in the accompanying drawings, of which:

Fig. 1 is a somewhat diagrammatic front elevation of an internal combustion engine having the invention applied thereto.

Fig. 2 is an enlarged vertical section on the line 2—2 of Figure 1.

Fig. 3 is a vertical section on the line 3—3 of Figure 2.

Referring to Figure 1, at A is shown the engine, at B the exhaust manifold thereof, at C the carbureter, at D the engine intake manifold, and at E the stove embodying the invention.

At 13 is shown the fuel supply pipe for the device, and at 16 is shown a return pipe for the surplus fuel. As in the devices shown and described in my prior applications, and as hereinafter described more in detail, only a predetermined amount of fuel can be retained in the burner of the stove, any surplus being returned through the pipe 16.

Referring to Figures 2 and 3, the stove unit comprises a body portion or casing 17 and a burner portion 18 disposed beneath the body portion 17, being secured to the latter by bolts 19 but spaced therefrom by a housing 20 which encloses the space between said burner and body portions and is heat insulated from the latter by a gasket 21 of suitable heat insulating material.

The body portion or casing 17 (hereinafter referred to as the body) encloses a chamber 22 surrounding a tubular passage 23, which when the device is in place, as shown in Figure 1, constitutes an extension of the inlet manifold D through which the carbureter C communicates with said manifold. The chamber 22 terminates at its upper end in an upwardly disposed chimney portion 24 which, in the construction herein shown, is formed with a lateral outlet 25 provided with a conical guard 26 of metal wire gauze or other suitable material adapted to prevent the escape of flame from the casing.

The burner portion 18 (hereinafter referred to as the burner) comprises a casting having laterally extending flanges 27 which receive the bolts 19 and upon which the lower end of the housing 20 is seated, said flanges having vertical air passages 28 through which air is admitted to the housing 20 and the lower end of the chamber 22. The bottom of the burner is surrounded by a wire gauze or similar screen 29 secured by a screw 30 to a projection 31 on the bottom of the casting 18, said screen serving to quench any flame which may escape through the air passages 28. Within the casting 18 is formed a horizontally disposed, substantially cylindrical fuel pit 32, in which is located a broad lamp wick 33, rolled into substantially cylindrical form, disposed about the walls of said fuel pit, and having its edges extending through a longitudinal slot at the top of the latter, said edges lying upon shoulders formed adjacent said slot and being covered by a sheet 34 of woven wire gauze or similar material. Extending from one end of the casting 18 into the fuel pit 32, and within the cylindrical wick 33, is an electric heating and vaporizing unit comprising a heating coil 35, disposed about a porcelain or similar core 36, supported by a plug 37 in threaded engagement with an opening at the end of the casting and having a binding screw 38 for making electrical connection with one end of the coil 35, the other end of which is grounded to the casting. Secured in a suitably located threaded opening in the casing 17 is an ignition plug 39 having a binding post 40 electrically connected with a single electrode 41 which is extended into close proximity to the wire gauze 34, the latter being grounded to the casting 18 and providing between itself and the electrode 41 a spark gap.

The parts thus far described, as to their general organization, and except as hereinafter pointed out, are, or may be, substantially the same as, or the equivalent of, the corresponding parts in my prior application, Serial No. 421,891, above referred to.

In accordance with the present invention, the body or casing 17 is provided immediately adjacent the manifold extension 23, and preferably above the latter, with an upper heating chamber 42 having an inlet passage 43 formed in the wall of said casing, said inlet passage communicating at its upper end with a threaded nipple 44 to which is connected a pipe 45 leading to and communicating with the interior of the exhaust manifold B, said pipe being preferably provided with a heat retaining jacket 46. The chamber 42 is separated from the chimney portion 24 of the lower chamber 22 by a wall 47. There is also provided an exhaust passage 480 connected to an exhaust pipe 481 leading to any convenient point and discharging to the atmosphere.

The fuel inlet pipe 13 is connected at its end to a nipple 50 in threaded engagement with the outer end of a short vertical passage 51, which communicates at its lower end with a horizontal, longitudinal passage 52, extending beneath the fuel pit 32. At its inner end the passage 52 communicates with a trough-like depression 53 formed in the bottom of the fuel pit at substantially the longitudinal center of the latter. By this construction it will be seen that the fuel is fed to the fuel pit through the bottom of the latter beneath the heating and vaporizing plug, so as to rise upwardly to said plug in a natural manner, thereby preventing the too sudden vaporization and possible explosion of the fuel which might be caused by the sudden injection thereof upon the top of the plug.

One of the flanges 27 of the casting 18 is provided with a threaded opening communicating with the fuel pit 32 adjacent the depression 53, but slightly above the latter, said opening receiving a nipple 54 to which the overflow pipe 16 is attached, said opening limiting the amount of fuel which may be introduced into the fuel pit. It will be seen that, by reason of the central inlet afforded by the trough-like depression 53, together with the substantially central arrangement of the overflow, the fuel pit 32 may be evenly supplied with fuel, irrespective of any reasonable inclination of the device with reference to the horizontal.

In operation, or when it is desired to start the motor, fuel is introduced through pipe 13 and fills the fuel pit and saturates the wick, the surplus fuel running back to the tank. The electric current is then turned on, thus heating the vaporizing coil 35 and vaporizing some of the fuel in the pit. The inflammable vapor rises from the gauze cover 34 and when it enters the chamber 22 is ignited by the ignition plug 39, which lights the burner. The flames play directly on the manifold extension 23, thereby heating the incoming charge, and continue to do so until the fuel in the fuel pit is exhausted, whereupon the burner will be automatically extinguished. In the meantime, however, the engine will have been started and a portion of the hot waste gases from the exhaust manifold B will pass through the pipe 45 to the heating chamber 42, so as to continue to heat the manifold extension 23 during the entire time the engine is running, said gases being finally exhausted through the exhaust pipe 481 to the atmosphere.

The terms "intake manifold" and "exhaust manifold" are, for convenience, herein used to designate generically the conduit through which the explosive charge is supplied to the engine cylinder or cylinders and that through which the products of combustion are discharged therefrom, respectively.

What I claim is:—

1. The combination with the intake manifold of an internal combustion engine, of a burner for heating said manifold, said burner having a fuel pit and a fuel inlet communicating with the bottom of said pit, means in said fuel pit for heating and vaporizing the fuel therein, and means for supplying liquid fuel to said inlet.

2. The combination with the intake manifold of an internal combustion engine, of a burner for heating said manifold, said burner having a fuel pit and a fuel overflow communicating with said pit at substantially the longitudinal center thereof, and means for supplying liquid fuel to said pit.

3. The combination with the intake manifold of an internal combustion engine, of a burner for heating said manifold, said burner having a fuel pit and a fuel inlet and fuel overflow communicating with said pit at substantially the longitudinal center thereof, and means for supplying liquid fuel to said fuel inlet.

4. The combination with the intake manifold of an internal combustion engine, of a burner for heating said manifold, said burner having a fuel pit, a fuel inlet communicating with the bottom of said pit, and a fuel overflow communicating with said pit at substantially the longitudinal center thereof, means in said fuel pit for heating and vaporizing the fuel therein, and means for supplying liquid fuel to said inlet.

5. The combination with the intake manifold of an internal combustion engine, of a burner for heating said manifold, said burner having a horizontally disposed, substantially cylindrical fuel pit formed in its under side with a substantially centrally disposed depression, a fuel inlet disposed beneath said fuel pit and communicating with said depression, and a fuel overflow communicating with said pit adjacent said depression, and about on a level with the top thereof, said overflow determining the fuel level, a wick disposed about the walls of said fuel pit and having its ends projecting from the top thereof and its lowest portion slightly below the fuel level, a vaporizing unit extending longitudinally into said fuel pit within said wick, and means for supplying liquid fuel to said inlet.

6. The combination with an internal combustion engine having an intake manifold, of a heater for said manifold having two chambers disposed in proximity to the walls thereof, a burner for supplying heat to one of said chambers, and means for supplying a heated fluid from said engine to the other of said chambers.

7. The combination with an internal combustion engine having an intake manifold, of a heater for said manifold having two chambers disposed in proximity to the walls thereof, means for supplying a heated fluid from said engine to one of said chambers, a burner for supplying heat to the other of said chambers, and means for supplying an automatically measured quantity of liquid fuel to said burner.

8. A heating unit insertable between the carbureter and the intake manifold of an internal combustion engine, said unit comprising a casing having a passage forming an extension of the intake manifold and two chambers disposed in proximity to the walls of said passage, a connection to one of said chambers for supplying a heated fluid thereto, and a burner for supplying heat to the other of said chambers.

9. A heating unit insertable between the carbureter and the intake manifold of an internal combustion engine, said unit comprising a body portion and a burner portion secured to said body portion, said body portion having a passage forming an extension of the intake manifold and two chambers disposed in proximity to the walls of said passage, one of said chambers having a connection for supplying a heated fluid thereto, and said burner portion being disposed beneath the other of said chambers to supply heat thereto and having a fuel pit, a fuel inlet communicating with the bottom of said pit, a fuel overflow communicating with said pit at substantially the longitudinal centre thereof, and a connection for supplying liquid fuel to said inlet.

In testimony whereof I affix my signature.

STEPHEN IVAN FEKETE.